(12) United States Patent
Zhang et al.

(10) Patent No.: US 8,452,453 B2
(45) Date of Patent: May 28, 2013

(54) ROBOT AND CONTROL DEVICE FOR SAME

(75) Inventors: Wennong Zhang, Fukuoka (JP);
Hiroshi Nakamura, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/468,037

(22) Filed: May 10, 2012

(65) Prior Publication Data

US 2012/0221146 A1    Aug. 30, 2012

Related U.S. Application Data

(63) Continuation of application No. PCT/JP2010/070074, filed on Nov. 11, 2010.

(30) Foreign Application Priority Data

Nov. 12, 2009   (JP) ................................. 2009-258557

(51) Int. Cl.
| | |
|---|---|
| *B25J 13/00* | (2006.01) |
| *B25J 17/02* | (2006.01) |
| *G05B 15/00* | (2006.01) |
| *B25J 18/06* | (2006.01) |

(52) U.S. Cl.
USPC ........... 700/260; 700/245; 700/247; 700/258; 901/21; 901/30; 901/36

(58) Field of Classification Search
USPC .................... 700/245–264; 901/2, 14, 16, 19, 901/21
See application file for complete search history.

(56) References Cited

U.S. PATENT DOCUMENTS 4,666,362 A * 5/1987 Landsberger et al. ........ 414/735
5,354,158 A * 10/1994 Sheldon et al. ............... 409/201
(Continued)

FOREIGN PATENT DOCUMENTS

| FR | 2672836 | 8/1992 |
|---|---|---|
| JP | 06-031662 | 2/1994 |

(Continued)

OTHER PUBLICATIONS

International Search Report for corresponding International Application No. PCT/JP2010/070074, Dec. 7, 2010.

(Continued)

*Primary Examiner* — Khoi Tran
*Assistant Examiner* — Dale Moyer
(74) *Attorney, Agent, or Firm* — Ditthavong Mori & Steiner, P.C.

(57) ABSTRACT

A robot is provided with: a base section; three motors set on the base section; a support so set that an axial centerline is perpendicular to a surface of the base section; pulleys; three wires into which nonlinear springs are incorporated; an output shaft connected to a load; a differential mechanism having a pinion gear connected to the output shaft and also having an affixation member disposed at the upper end of the support; a universal joint disposed at the ring of the differential mechanism; and a wire guide disposed at the affixation member of the differential mechanism. Two side gears of the differential mechanism and two motors are connected in one-to-one correspondence by means of two wires through the pulleys, and the remaining motor and the universal joint are connected by means of the remaining wire which is passed through the wire guide.

3 Claims, 16 Drawing Sheets

U.S. PATENT DOCUMENTS

| | | | | |
|---|---|---|---|---|
| 5,538,373 | A * | 7/1996 | Kirkham | 409/131 |
| 6,330,837 | B1 * | 12/2001 | Charles et al. | 74/490.06 |
| 7,172,385 | B2 * | 2/2007 | Khajepour et al. | 414/735 |
| 7,367,771 | B2 * | 5/2008 | Khajepour et al. | 414/735 |
| 7,367,772 | B2 * | 5/2008 | Khajepour et al. | 414/735 |
| 7,498,758 | B2 * | 3/2009 | Baba et al. | 318/568.12 |
| 7,615,956 | B2 * | 11/2009 | Tsusaka | 318/568.11 |
| 2003/0005786 | A1 * | 1/2003 | Stuart et al. | 74/479.01 |
| 2004/0199147 | A1 | 10/2004 | Nishizawa et al. | |
| 2009/0001919 | A1 | 1/2009 | Tsusaka | |

FOREIGN PATENT DOCUMENTS

| | | |
|---|---|---|
| JP | 09-131687 | 5/1997 |
| JP | 10-146789 | 6/1998 |
| JP | 11-077577 | 3/1999 |
| JP | 2000-079586 | 3/2000 |
| JP | 2003-340768 | 12/2003 |
| JP | 2004-122286 | 4/2004 |
| JP | 2004-322283 | 11/2004 |
| JP | 2006-035325 | 2/2006 |
| JP | 2006-250296 | 9/2006 |

OTHER PUBLICATIONS

Written Opinion for corresponding International Application No. PCT/JP2010/070074, Dec. 7, 2010.

English translation of the Written Opinion of the International Searching Authority for International Application No. PCT/JP2010/070074, Jul. 12, 2010.

* cited by examiner

ROBOT AND CONTROL DEVICE FOR SAME

CROSS-REFERENCE TO RELATED APPLICATIONS

The priority application number JP2009-258557, Robot and Control Device for Same, Nov. 12, 2009, Wennong Zhang and Hiroshi Nakamura, upon which this patent application is based is hereby incorporated by reference. This application is a continuation of PCT/JP2010/070074, Robot and Control Device for Same, Nov. 11, 2010, Wennong Zhang and Hiroshi Nakamura.

BACKGROUND OF THE INVENTION

1. Field of the Invention

The present invention relates to a robot changing a multi-degree-of freedom attitude and a control device therefor.

2. Description of the Background Art

Recently, studies of service robots and human cooperation industrial robots have been actively conducted. These robots directly come into contact with humans, and hence guarantee of safety is important. In order to keep safety of the whole robots, it is required that each joint of a robot is flexible and lightweight. If rigidity of the joint lowers, however, control performance such as working accuracy and responsiveness of the robot is deteriorated.

In order to compatibly attain safety and controllability for a robot, a conventional articulated robot utilizes a wire driving mechanism redundant in view of the degree of freedom of joints (refer to Japanese Patent Laying-Open No. 2004-322283, for example).

Nonlinear springs and a tension sensor are introduced into the wire driving mechanism, for feeding back an actual rotation angle while controlling tension of each wire.

Thus, the conventional articulated robot controls both of an attitude and rigidity of the robot by controlling force of a redundant actuator.

SUMMARY OF THE INVENTION

A first aspect is an articulated robot including a base section, three motors set on the base section, three take-ups mounted on the three motors respectively, a support so set that an axial centerline is perpendicular to a surface of the base section, a Cardan joint mounted on an upper end of the support, a movable plate mounted on the Cardan joint, three universal couplings set on a bottom portion of the movable plate, three wires into which nonlinear springs coupling the three take-ups and the three universal couplings in one-to-one correspondence to each other are incorporated, and an output shaft so fixed that an axial centerline is perpendicular to an upper surface of the movable plate, providing a fixed Cartesian coordinate system xyzo so that a y-axis is parallel to an axial centerline of a shaft of the Cardan joint in contact with the support assuming that the intersection between the axial centerline of the support and the surface of the base section is the origin o, assuming that the axial centerline of the support is a z-axis and assuming that a direction separating from the surface of the base section is the positive direction of the z-axis, providing such a movable Cartesian coordinate system x'y'z'o' that an x'-axis is parallel to the axial centerline of the shaft of the Cardan joint in contact with the movable plate and moves with the movable plate assuming that the intersection between the axial centerline of the output shaft and a lower surface of the movable plate is the origin o', assuming that the axial centerline of the output shaft is a z'-axis and assuming that a direction separating from the upper surface of the movable plate is the positive direction of the z'-axis, and arranging the three motors so that one of the take-ups is present on a negative axis of x and the remaining two of the take-ups are present in the first quadrant and the fourth quadrant of an xoy coordinate system respectively, arranging the three universal couplings so that phases in an x'o'y' coordinate system reach the same values as phases of the three take-ups in the xoy coordinate system respectively, and coupling the three take-ups and the three universal couplings in the same phases of these two different coordinate systems respectively in one-to-one correspondence to each other with the three wires.

A second aspect is an articulated robot including a base section, three motors set on the base section, three take-ups mounted on the three motors respectively, a support so set that an axial centerline is perpendicular to a surface of the base section, a rotating shaft coupling mounted on an upper end of the support, a rotating shaft mounted on the rotating shaft coupling, a revolving shaft coupling mounted on an upper end of the rotating shaft, a movable plate mounted on the revolving shaft coupling, three universal couplings set on a bottom portion of the movable plate, three wires into which nonlinear springs coupling the three take-ups and the three universal couplings in one-to-one correspondence to each other are incorporated, and an output shaft so fixed that an axial centerline is perpendicular to an upper surface of the movable plate, providing such a movable Cartesian coordinate system x'y'z'o' that a y'-axis is parallel to an axial centerline of the revolving shaft and moves with the movable plate assuming that the intersection between the axial centerline of the output shaft and a lower surface of the movable plate is the origin o', assuming that the axial centerline of the output shaft is a z'-axis and assuming that a direction separating from the upper surface of the movable plate is the positive direction of the z'-axis, providing a fixed Cartesian coordinate system xyzo so that a y-axis is parallel to the y'-axis when the axial centerline of the output shaft coincides with an axial centerline of the rotating shaft assuming that the intersection between the axial centerline of the support and the surface of the base section is the origin o, assuming that the axial centerline of the support is a z-axis and assuming that a direction separating from the surface of the base section is the positive direction of the z-axis, and arranging the three motors so that one of the take-ups is present on a negative axis of x and the remaining two of the take-ups are present in the first quadrant and the fourth quadrant of an xoy coordinate system respectively, arranging the three universal couplings so that phases in an x'o'y' coordinate system reach the same values as phases of the three take-ups in the xoy coordinate system respectively, and coupling the take-up present on the negative axis of x and the universal coupling present on a negative axis of x', the take-up present in the first quadrant of the xoy coordinate system and the universal coupling present in the fourth quadrant of the x'o'y' coordinate system, and the take-up present in the fourth quadrant of the xoy coordinate system and the universal coupling present in the first quadrant of the x'o'y' coordinate system in one-to-one correspondence to each other with the three wires respectively.

A third aspect performs control of tension on the basis of a tension command for a wire and a tension signal for the wire, generates the tension command for each wire on the basis of a target command for an attitude angle, a target command for rigidity and a rotation angle signal for each motor and controls an attitude angle and rigidity of the articulated robot, and includes an attitude angle estimator calculating an estimated value of the attitude angle on the basis of the rotation angle signal for each motor and the tension signal for each wire, an attitude angle controller receiving the deviation between the target command for the attitude angle and the estimated value of the attitude angle and outputting an attitude torque command, and a tension command calculator calculating the tension command on the basis of the attitude torque command, the target command for rigidity and the estimated value of the attitude angle.

Other aspect includes a base section, three motors set on the base section, a support so set that an axial centerline is perpendicular to a surface of the base section, a pulley, three wires into which nonlinear springs are incorporated and an output shaft linked to a load, includes a differential mechanism in which a pinion gear is linked to the output shaft and a fixed member is set on an upper end of the support, a universal coupling set on a ring of the differential mechanism and a wire guide set on the fixed member of the differential mechanism, couples two pulleys coupled to two side gears of the differential mechanism respectively and two pulleys coupled to two of the motors respectively to each other in one-to-one correspondence with two of the wires, and couples a pulley coupled to the remaining one of the motors and the universal coupling to each other with the remaining one of the wires through the wire guide.

DESCRIPTION OF THE EMBODIMENTS

Embodiments are now described with reference to the drawings.

Embodiment 1

Figure 1A:
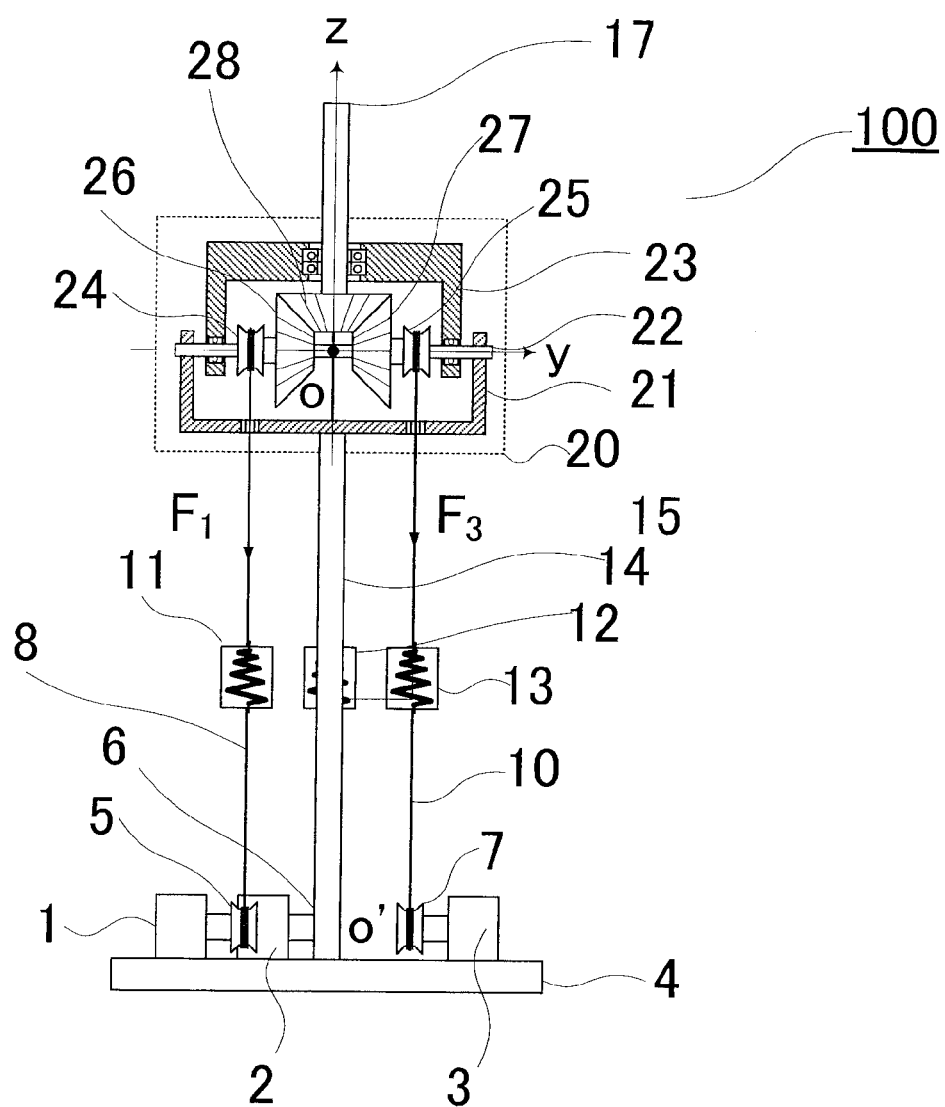
FIGS. 1A and 1B are structural diagrams of an articulated robot showing a first embodiment.
Figure 1B:
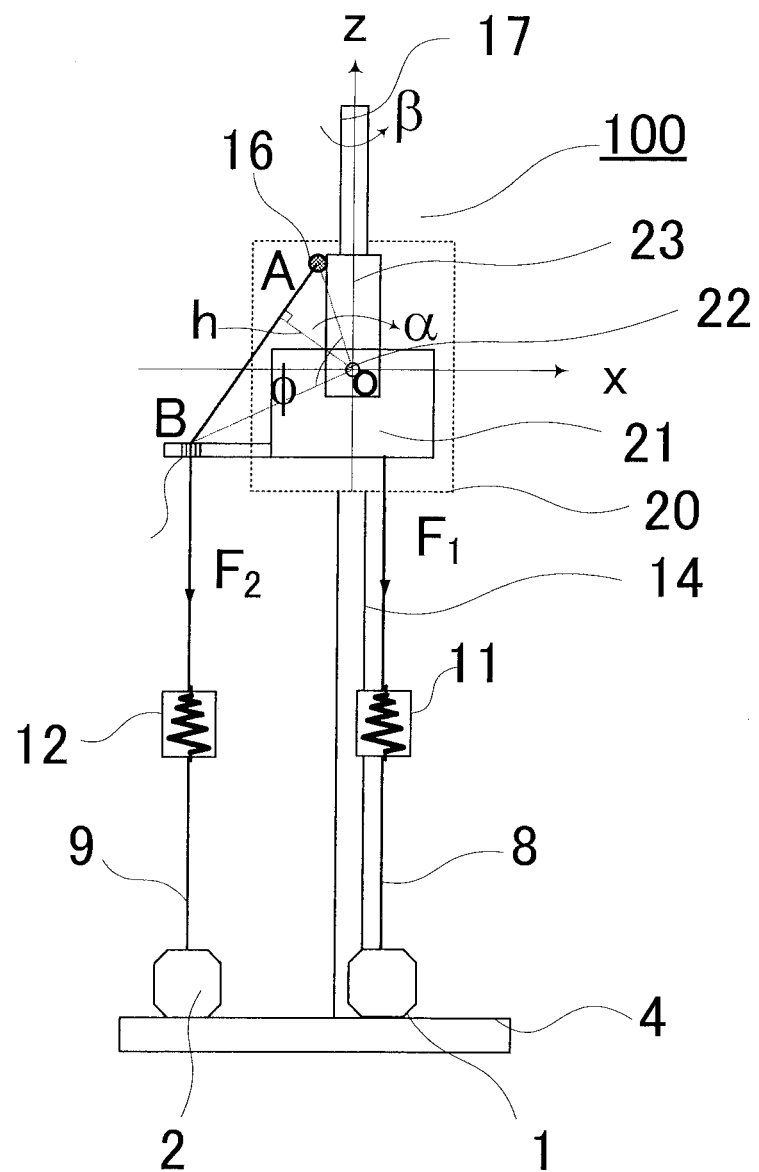

FIGS. 1A and 1B illustrate structural diagrams of an articulated robot showing a first embodiment. FIG. 1A is a front elevational view, and FIG. 1B is a side elevational view. Referring to the figures, stators of motors 1, 2 and 3 are set on an upper portion of a base section 4, and pulleys 5, 6 and 7 are coupled to forward ends of rotating shafts. A support 14 is so set that an axial centerline is perpendicular to the upper portion of the base section 4. A differential mechanism 20 includes a fixed member 21 set on a forward end of the support 14, a support shaft 22 fixed to both sides of the fixed member 21, side gears 26 and 27 provided with pulleys 24 and 25 respectively for rotating on the support shaft 22, a pinion gear 28 simultaneously in contact with the side gears 26 and 27, and a ring 23 rotating on the support shaft 22. In an output shaft 17, an end is fixed to the pinion gear 28, another end is linked to a load, and a middle portion is constrained to the ring 23 through a bearing. A wire 8 couples the pulley 5 and the pulley 24 to each other, while a wire 10 couples the pulley 6 and the pulley 25 to each other. A wire 9 couples the pulley 6 and a universal coupling 16 set on the ring 23 to each other through a wire guide 15 set on the fixed member 21. Nonlinear springs 11, 12 and 13 are incorporated into the wires 8, 9 and 10 respectively. A nonlinear spring is that whose spring constant is not a constant value but changes by displacement. For example, a coil spring whose pitch is changed stepwise is employed. Such structure is not restricted to this, but can take a structure obtained by combining a movable pulley between two motors and two stationary pulleys coupled to the respective motors through wires. The motors 1, 2 and 3 are so driven that the output shaft 17 revolves on the support shaft 22 while rotating.

Figure 2:
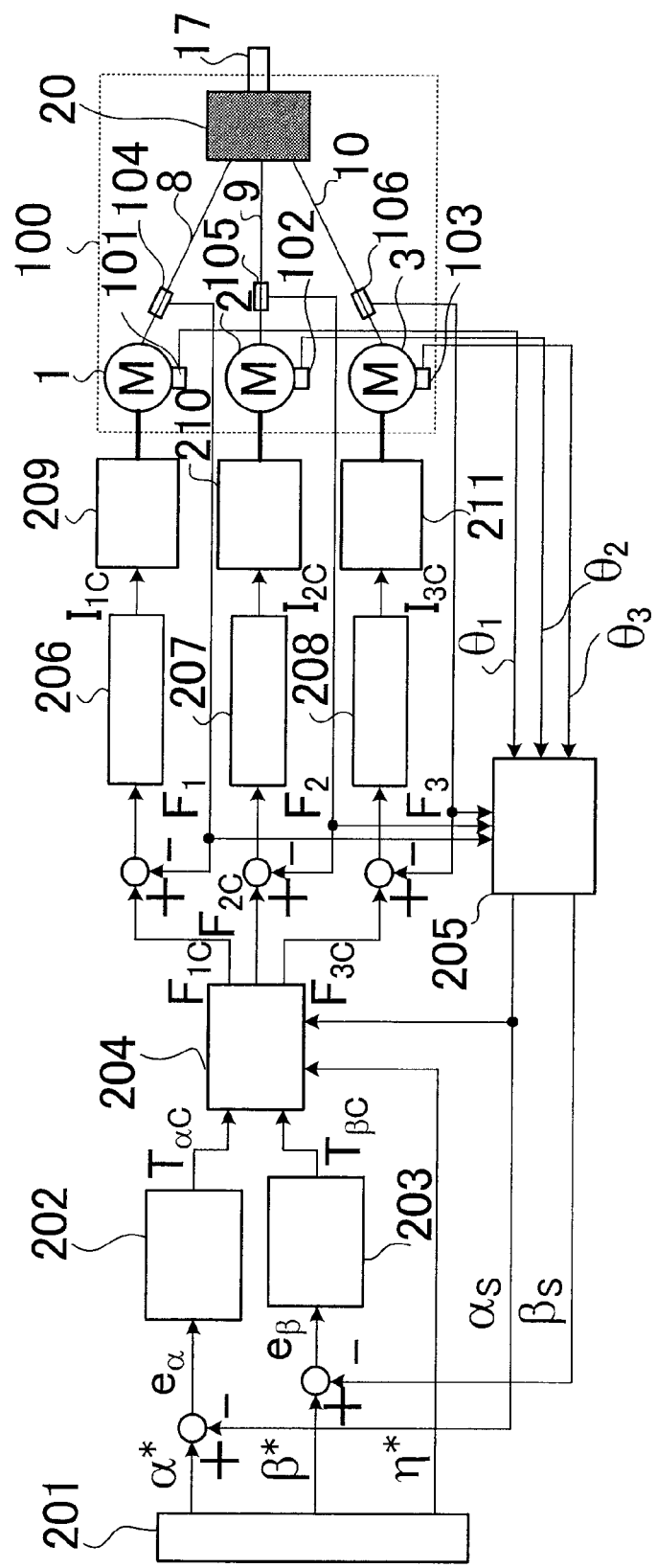
FIG. 2 is a block diagram of a control device related to a first control technique.

FIG. 2 is a block diagram of a control device related to a first control technique. Referring to the figure, a target command generator 201 generates a target command value $\alpha^*$ for a revolution angle $\alpha$ of the output shaft 17, a target command value $\beta^*$ for a rotation angle $\beta$ of the output shaft 17 and a target command value $\eta^*$ for rigidity. Rotation angles $\theta_1$, $\theta_2$ and $\theta_3$ of the motors 1, 2 and 3 are detected by encoders 101, 102 and 103 respectively. Tension sensors 104, 105 and 106 detect tension $F_1$, $F_2$ and $F_3$ of the wires 8, 9 and 10 respectively. An attitude angle estimator 205 receives outputs of the encoders 101, 102 and 103 and outputs of the tension sensors 104, 105 and 106 and outputs an estimated value $\alpha_s$ of the revolution angle $\alpha$ and an estimated value $\beta_s$ of the rotation angle $\beta$. Attitude angle controllers 202 and 203 receive the deviation $e_\alpha$ between the target command value $\alpha^*$ and the estimated value $\alpha_s$ of the revolution angle $\alpha$ and the deviation $e_\beta$ between the target command value $\beta^*$ and the estimated value $\beta_s$ of the rotation angle $\beta$ and output a revolution torque command $T_{\alpha c}$ and a rotational torque command $T_{\beta c}$ respectively. A tension command calculator 204 calculates tension commands $F_{1c}$, $F_{2c}$ and $F_{3c}$ for the wires 8, 9 and 10 on the basis of the revolution torque command $T_{\alpha c}$ and the rotational torque command $T_{\beta c}$. Tension controllers 206, 207 and 208 receive the deviation between the tension command $F_{1c}$ for the wire 8 and the tension $F_1$, the deviation between the tension command $F_{2c}$ for the wire 9 and the tension $F_2$ and the deviation between the tension command $F_{3c}$ for the wire 10 and the tension $F_3$ and output current commands $I_{1c}$, $I_{2c}$ and $I_{3c}$ for the motors 1, 2 and 3 respectively. Numerals 209, 210 and 211 denote motor drivers, which drive-control the respective motors on the basis of the current commands $I_{1c}$, $I_{2c}$ and $I_{3c}$ for the motors 1, 2 and 3 respectively.

Figure 3:
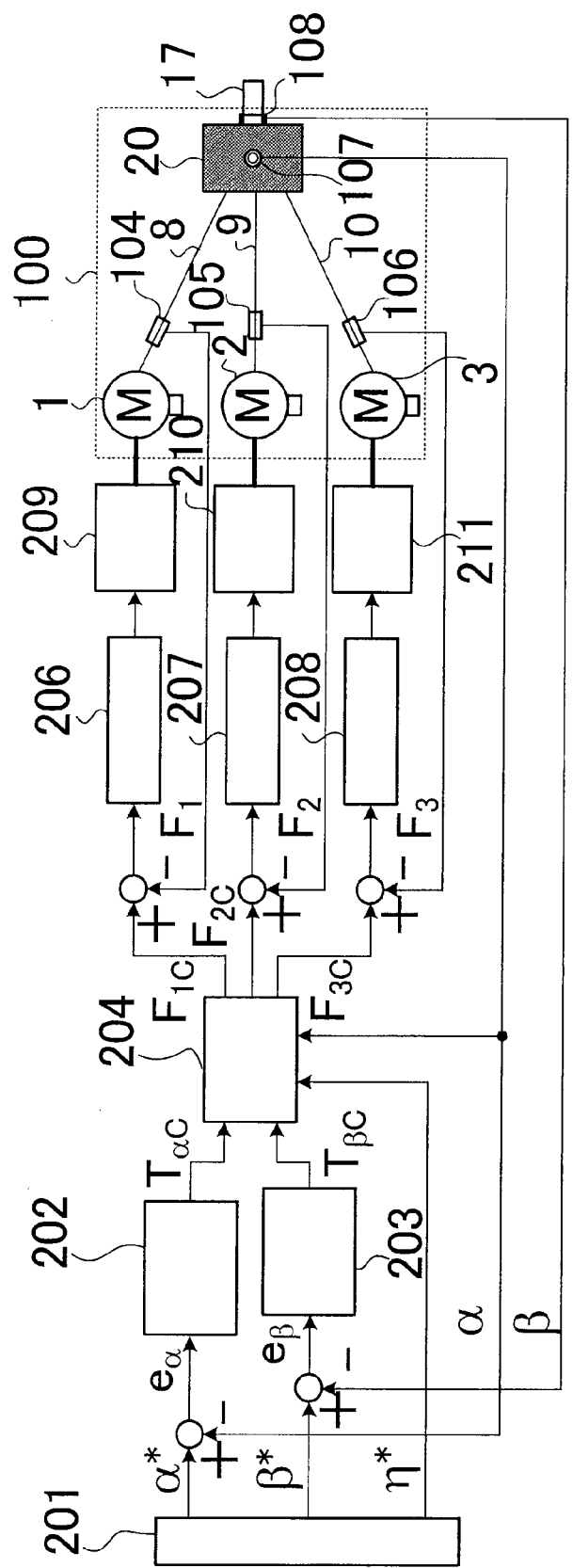
FIG. 3 is a block diagram of a control device related to a second control technique.

FIG. 3 is a block diagram of a control device related to a second control technique. Referring to the figure, angle sensors 107 and 108 detect the revolution angle $\alpha$ and the rotation angle $\beta$ respectively. A portion where this control device is different from the control device related to a first control technique is the portion provided with the angle sensors in place of the attitude angle estimator.

An operation principle is now described.

First, an equation of motion of the articulated robot is derived.

A Cartesian coordinate system xyzo is provided to assume that the intersection between an axial centerline of the support shaft 22 and an axial centerline of the output shaft 17 is the origin o, to assume that the axial centerline of the support shaft 22 is a y-axis, to assume that an axial centerline of the support 14 is a z-axis and to assume that a direction separating from the base section 4 is the positive direction of the z-axis, and a position where the axial centerline of the output shaft 17 coincides with the z-axis is assumed to be an initial position of an articulated robot mechanism.

An angle formed by a straight line passing through a center point A of the universal coupling 16 on the initial position and the origin o of the Cartesian coordinate system and a straight line passing through a point B where the wire 9 is in contact with an upper portion of the wire guide 15 and the origin o of the Cartesian coordinate system is assumed to be $\phi$. Further, a state where all wires completely elongate but the tension is zero (in other words, the quantities of expansion and contraction of the nonlinear springs are zero) is assumed to be an initial state. It is supposed that all wires are controlled to completely elongate (tension of the wires is at least zero).

It is assumed that $F_1$, $F_2$ and $F_3$ represent the tension of the wires 8, 9 and 10 respectively. Assuming that R represents the radii of the pulleys 24 and 25, torques generated by the tension $F_1$ and $F_3$ of the wires 8 and 10 are:

$$T_1 = F_1 R \quad (1)$$

and $$T_3 = F_3 R \quad (2)$$

respectively. Assuming that $L_{Ao}$ represents the length of a line segment Ao and $L_{Bo}$ represents the length of a line segment Bo, torque generated by the tension $F_2$ of the wire 9 is:

$$T_2 = F_2 h \quad (3)$$

where h represents the distance from a point o to a straight line AB, and is expressed in an equation (4):

[Num 4]

$$h = \frac{L_{Ao} L_{Bo} \sin(\phi + \alpha)}{\sqrt{L_{Ao}^2 + L_{Bo}^2 - 2 L_{Ao} L_{Bo} \cos(\phi + \alpha)}} \quad (4)$$

Hence, revolution torque revolving a mechanical movable portion of an articulated robot 100 on the axial centerline of the support shaft 22 is:

$$T_\alpha = T_1 + T_3 - T_2 = F_1 R + F_3 R - F_2 h \quad (5)$$

Further, rotational torque rotating the mechanical movable portion of the articulated robot 100 on the axial centerline of the output shaft 17 is:

$$T_\beta = (T_1 - T_3) n = (F_1 - F_3) n R \quad (6)$$

where n represents the gear ratio between the pinion gear and the side gears.

It is assumed that $\rho_1$, $\rho_2$ and $\rho_3$ represent displacements of wire upper ends on points where the wires 8, 9 and 10 come into contact with the differential mechanism respectively (it is assumed that a direction separating from the nonlinear springs is assumed to be positive). The displacements $\rho_1$, $\rho_2$ and $\rho_3$ of the wire upper ends express the relation between the revolution angle $\alpha$ and the rotation angle $\beta$ as equations (7) to (9):

$$\alpha = (\rho_1 + \rho_2)/2R \quad (7)$$

$$\beta = (\rho_1 + \rho_3)/nR \quad (8)$$

[Num 9]

$$\rho_2 \sqrt{L_{Ao}^2 + L_{Bo}^2 - 2 L_{Ao} L_{Bo} \cos(\phi + \alpha)} - \sqrt{L_{Ao}^2 + L_{Bo}^2 - 2 L_{Ao} L_{Bo} \cos\phi} \quad (9)$$

It is assumed that the relation between the nonlinear springs 11, 12 and 13 and quantities $\sigma_1$, $\sigma_2$ and $\sigma_3$ of expansion and contraction to which generated force $f_1$, $f_2$ and $f_3$ corresponds is expressed in an equation (10):

$$f_1 = k_1(\sigma_1)\sigma_1, f_2 = k_2(\sigma_2)\sigma_2, f_3 = k_3(\sigma_3)\sigma_3 = \quad (10)$$

where $k_1(\cdot)$, $k_2(\cdot)$ and $k_3(\cdot)$ represent elastic coefficients of the nonlinear springs, and are monotonically increasing functions. It is assumed that $k_1(\cdot)$, $k_2(\cdot)$ and $k_3(\cdot)$ are linear functions, for the purpose of simplification. The tension of the nonlinear springs is equal to the tension of the wires, and hence the relation between the tension $F_1$, $F_2$ and $F_3$ of the wires 8, 9 and 10 and the quantities $\sigma_1$, $\sigma_2$ and $\sigma_3$ of expansion and contraction of the nonlinear springs 11, 12 and 13 is:

$$F_1 = K_1 \sigma_1^2, F_2 = K_2 \sigma_2^2, F_3 = K_3 \sigma_3^2 \quad (11)$$

where $K_1$, $K_2$ and $K_3$ represent constants.

Assuming that the quantity of expansion and contraction of a wire is zero (while an actual wire expands and contracts, the expansion and contraction may be regarded as part of nonlinear spring expansion and contraction), an upper end displacement of each wire becomes the sum of the quantity of expansion and contraction of the nonlinear spring corresponding to the wire and take-up quantities of the pulleys (5, 6 and 7). Assuming that r represents the radii of the pulleys 5, 6 and 7, the following holds:

$$\rho_1 = \sigma_1 + \theta_1 r; \rho_2 = \sigma_2 + \theta_2 r; \rho_3 = \sigma_3 + \theta_3 r \quad (12)$$

where $\theta_1$, $\theta_2$ and $\theta_3$ represent rotation angles of the motors 1, 2 and 3 (values obtained by multiplying the rotation angles of the motors by the gear ratio in a case where the gears are present between the motors and the pulleys) respectively.

A specific method of implementing the attitude angle estimator 205 and the tension command calculator 204 is described on the basis of the above equations.

From the equation (11),
[Num 13]

$$\sigma_1 = \sqrt{F_1/K_1}, \sigma_3 = \sqrt{F_3/K_3} \quad (13)$$

When substituting the equation (11) for the equation (12),
[Num 14]

$$\rho_1 = \sqrt{F_1/K_1} + \theta_1 r; \rho_3 = \sqrt{F_3/K_3} + \theta_3 r \quad (14)$$

When substituting the equation (14) for the equation (7) and the equation (8), the estimated value $\alpha_s$ of the revolution angle $\alpha$ and the estimated value $\beta_s$ of the rotation angle $\beta$ are given as an equation (15) and an equation (16) respectively:
[Num 15]

$$\alpha_s = (\sqrt{F_1/K_1} + \sqrt{F_3/K_3} + \theta_1 r + \theta_3 r)/2R \quad (15)$$

[Num 16]

$$\beta_s = (\sqrt{F_1/K_1} - \sqrt{F_3/K_3} + \theta_1 r - \theta_3 r)/2R \quad (16)$$

Simultaneous equations of the equation (7) and the equation (8) are solved as:

$$\rho_1 = -R\alpha - 0.5nR\beta \quad (17)$$

$$\rho_3 = -R\alpha + 0.5nR\beta \quad (18)$$

When performing partial differential of $\alpha$ on both sides of the equation (17), the equation (18) and the equation (9) and noting the equation (4),

[Num 19]

$$\frac{\partial \rho_1}{\partial \alpha} = -R,$$
$$\frac{\partial \rho_2}{\partial \alpha} = h, \quad (19)$$
$$\frac{\partial \rho_3}{\partial \alpha} = -R$$

When performing partial differential of $\beta$ on both sides of the equation (17), the equation (18) and the equation (9),

[Num 20]

$$\frac{\partial \rho_1}{\partial \beta} = -0.5\, nR,$$
$$\frac{\partial \rho_2}{\partial \beta} = 0, \quad (20)$$
$$\frac{\partial \rho_3}{\partial \beta} = 0.5\, nR$$

When performing partial differential of $\alpha$ on both sides of the equation (12),

[Num 21]

$$\frac{\partial \sigma_1}{\partial \alpha} = \frac{\partial \rho_1}{\partial \alpha},$$
$$\frac{\partial \sigma_2}{\partial \alpha} = \frac{\partial \rho_2}{\partial \alpha}, \quad (21)$$
$$\frac{\partial \sigma_3}{\partial \alpha} = \frac{\partial \rho_3}{\partial \alpha}$$

When performing partial differential of $\beta$ on both sides of the equation (12),

[Num 22]

$$\frac{\partial \sigma_1}{\partial \beta} = \frac{\partial \rho_1}{\partial \beta},$$
$$\frac{\partial \sigma_2}{\partial \beta} = \frac{\partial \rho_2}{\partial \beta}, \quad (22)$$
$$\frac{\partial \sigma_3}{\partial \beta} = \frac{\partial \rho_3}{\partial \beta}$$

When performing partial differential of $\alpha$ on both sides of the equation (11),

[Num 23]

$$\frac{\partial F_1}{\partial \alpha} = 2\sqrt{K_1 F_1}\,\frac{\partial \sigma_1}{\partial a},$$
$$\frac{\partial F_2}{\partial \alpha} = 2\sqrt{K_2 F_2}\,\frac{\partial \sigma_2}{\partial \alpha}, \quad (23)$$
$$\frac{\partial F_3}{\partial \alpha} = 2\sqrt{K_3 F_3}\,\frac{\partial \sigma_3}{\partial \alpha}$$

When performing partial differential of $\beta$ on both sides of the equation (11),

[Num 24]

$$\frac{\partial F_1}{\partial \beta} = 2\sqrt{K_1 F_1}\,\frac{\partial \sigma_1}{\partial \beta},$$
$$\frac{\partial F_2}{\partial \beta} = 2\sqrt{K_2 F_2}\,\frac{\partial \sigma_2}{\partial \beta}, \quad (24)$$
$$\frac{\partial F_3}{\partial \beta} = 2\sqrt{K_3 F_3}\,\frac{\partial \sigma_3}{\partial \beta}$$

When substituting the equation (19) for the equation (21) and further substituting the equation (21) for the equation (23),

[Num 25]

$$\frac{\partial F_1}{\partial \alpha} = -2R\sqrt{K_1 F_1},$$
$$\frac{\partial F_2}{\partial \alpha} = 2h\sqrt{K_2 F_2}, \quad (25)$$
$$\frac{\partial F_3}{\partial \alpha} = -2R\sqrt{K_3 F_3}$$

When substituting the equation (20) for the equation (22) and further substituting the equation (22) for the equation (24),

[Num 26]

$$\frac{\partial F_1}{\partial \beta} = -nR\sqrt{K_1 F_1},$$
$$\frac{\partial F_2}{\partial \beta} = 0, \quad (26)$$
$$\frac{\partial F_3}{\partial \beta} = nR\sqrt{K_3 F_3}$$

When performing partial differential of $\alpha$ on both sides of the equation (4),

[Num 27]

$$\frac{\partial h}{\partial \alpha} = \frac{L_{Ao}L_{Bo}\{(L_{Ao}^2 + L_{Bo}^2)\cos(\phi+\alpha) - L_{Ao}L_{Bo}(1+\cos^2(\phi+\alpha))\}}{\{L_{Ao}^2 + L_{Bo}^2 - 2L_{Ao}L_{Bo}\cos(\phi+\alpha)\}^{1.5}} \quad (27)$$

When performing partial differential of α on both sides of the equation (5), revolution rigidity is:

[Num 28]

$$\eta_\alpha = -\frac{\partial T_\alpha}{\partial \alpha} = -R\left(\frac{\partial F_1}{\partial \alpha} + \frac{\partial F_3}{\partial \alpha}\right) + \frac{\partial F_2}{\partial \alpha} h + F_2 \frac{\partial h}{\partial \alpha} \quad (28)$$

When substituting the equation (25) and the equation (27) for the equation (28),

[Num 29]

$$\eta_\alpha = -\frac{\partial T_\alpha}{\partial \alpha} \quad (29)$$
$$= 2R^2\left(\sqrt{K_1 F_1} + \sqrt{K_3 F_3}\right) + 2h^2\sqrt{K_2 F_2} + g(\alpha)F_2$$

where

[Num 30]

$$g(\alpha) = \frac{L_{Ao}L_{Bo}\{(L_{Ao}^2 + L_{Bo}^2)\cos(\phi + \alpha) - L_{Ao}L_{Bo}(1 + \cos^2(\phi + \alpha))\}}{\{L_{Ao}^2 + L_{Bo}^2 - 2L_{Ao}L_{Bo}\cos(\phi + \alpha)\}^{1.5}} \quad (30)$$

When performing partial differential of β on both sides of the equation (6), rotation rigidity is:

[Num 31]

$$\eta_\beta = -\frac{\partial T_\beta}{\partial \alpha} = -nR\left(\frac{\partial F_1}{\partial \beta} - \frac{\partial F_3}{\partial \beta}\right) \quad (31)$$

When substituting the equation (26) for the equation (31),

[Num 32]

$$\eta_\beta = -\frac{\partial T_\beta}{\partial \beta} = n^2 R^2\left(\sqrt{K_1 F_1} + \sqrt{K_3 F_3}\right) \quad (32)$$

According to the equation (5) and the equation (6), $$F_1 = (T_\alpha + T_\beta/n + F_2 h)/2R \quad (33)$$

$$F_3 = (T_\alpha - T_\beta/n + F_2 h)/2R \quad (34)$$

When substituting the equation (33) and the equation (34) for the equation (28) or the equation (33), it is understood that the revolution rigidity $\eta_\alpha$ and the rotation rigidity $\eta_\beta$ are both functions of $F_2$. In other words, while it is not possible to separately control the revolution rigidity $\eta_\alpha$ and the rotation rigidity $\eta_\beta$, the same can be both changed by controlling $F_2$.

Hence, calculation of the tension commands is implemented as follows:

When solving simultaneous equations of the equation (28), the equation (33) and the equation (34) assuming that $T_\alpha$ and $T_\beta$ are $T_{\alpha C}$ and $T_{\beta C}$ respectively, assuming that $F_1$, $F_2$ and $F_3$ are $F_{1C}$, $F_{2C}$ and $F_{3C}$ respectively, assuming that $\eta_\alpha$ is $\eta^*$ in a case of employing the revolution rigidity as a safety index and assuming that α is $\alpha_S$ in a case of employing the first control technique and solving simultaneous equations of the equation (32), the equation (33) and the equation (34) assuming that $\eta_\beta$ is $\eta^*$ in a case of employing the rotation rigidity as a safety index, the tension commands $F_{1C}$, $F_{2C}$ and $F_{3C}$ can be obtained.

When giving a command value $F_{2C}$ of $F_2$ corresponding to the target command value $\eta^*$ for the rigidity, $F_{1C}$ and $F_{3C}$ can be easily calculated from the equation (33) and the equation (33) without solving simultaneous equations.

In general, a phase lag is small in a tension control minor loop as compared with a main loop of attitude control, and hence the gains of the tension controllers can be remarkably raised, and response characteristics of a tension control minor closed loop are high. In other words, the tension of the wires is controlled according to the tension commands. Hence, the revolution torque $T_\alpha$ and the rotational torque $T_\beta$ can be made to follow the revolution torque command $T_{\alpha C}$ and the rotational torque command $T_{\beta C}$ by employing the tension commands obtained on the basis of the equation (33) and the equation (34). In other words, rigidity control does not influence attitude control, but the rigidity and the attitude can be independently and correctly controlled.

Influence of the rigidity on control performance remarkably appears when the output shaft 17 is displaced at a high adjustable speed and a low speed. On the other hand, safety is to be taken into consideration when the output shaft 17 is displaced at a high speed. Therefore, the target command for the rigidity may be given at a small value in high-speed displacement, and at a large value in high-adjustable-speed and low-speed displacement.

In a case where the distance between the support shaft 22 and the base section 4 and the lengths of the wires are sufficiently large, it is possible for the movable range of the articulated robot 100 that rotation on the axial center of the output shaft 17 is 360° and revolution on the axial center of the support shaft 22 is close to 180° ($-\psi<\alpha<180°-\psi$). Further, the set position of the wire guide 15 is so changed that a starting position and a stopping position change although the movable range of the revolution is substantially unchanging. While the movable range of this articulated robot is wider than all joints of a human, the same is revolvable and rotatable and hence optimum as an elbow joint of the human.

Thus, an attitude angle and rigidity of a joint can be made to independently and correctly follow a target command in a wide range by constituting an articulated robot having motors redundant in view of the degree of freedom of the joint, wires incorporating nonlinear springs coupling the motors and an output shaft to each other and transmitting force and a differential mechanism and constructing a control device for the articulated robot giving tension commands for the wires in response to an attitude torque command necessary for feedback control of an attitude and a target command for rigidity and controlling tension of the wires. Further, excellent safety and superior control performance can be compatibly attained by giving the target command for rigidity at a small value in high-speed displacement and at a large value in high adjustable-speed and low-speed displacement.

Embodiment 2

Figure 4:
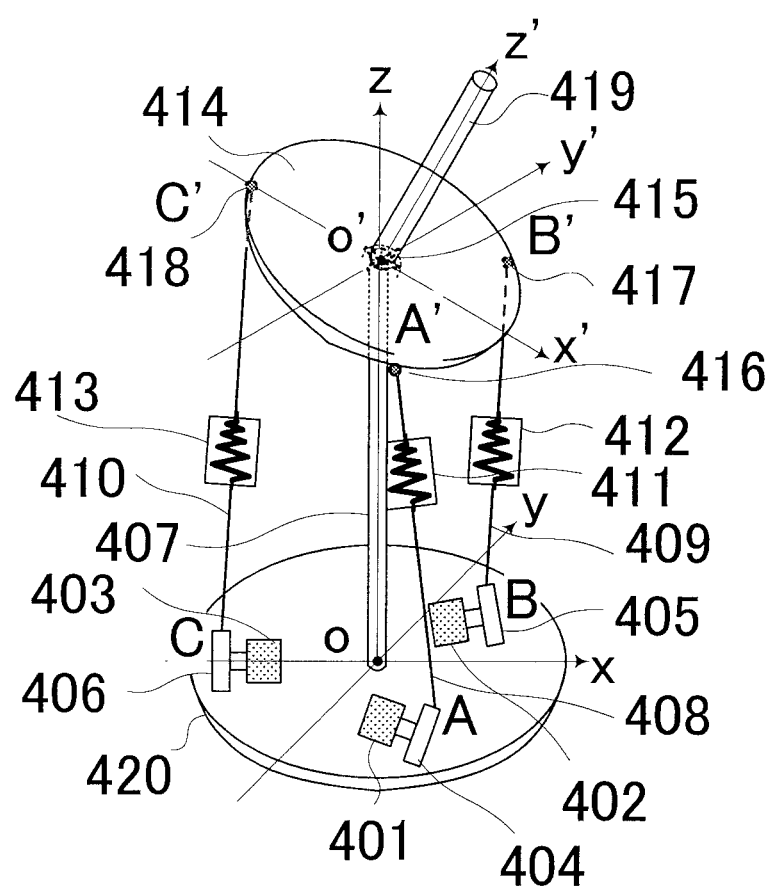
FIG. 4 is a structural diagram of an articulated robot showing a second embodiment.

FIG. 4 is a structural diagram of an articulated robot showing a second embodiment. Referring to the figure, numerals 401, 402 and 403 denote motors, whose stators are set on an upper portion of a base section 420. Numerals 404, 405 and 406 denote take-ups, which take up wires while rotating with rotators of the motors. Numerals 408, 409 and 410 denote wires, into which nonlinear springs 11, 12 and 13 are incorporated. Numeral 407 denotes a support, which is so set that an axial centerline is perpendicular to an upper surface of the base section 420. Numeral 414 denotes a movable plate, to whose upper portion an output shaft 419 is perpendicularly fixed. Numeral 415 denotes a Cardan joint having two shafts perpendicular to each other, in which one shaft is linked to a forward end of the support 407 and another shaft is linked to the movable plate 414. A fixed Cartesian coordinate system xyzo is so provided that a y-axis is parallel to an axial centerline of a shaft of the Cardan joint 415 in contact with the support 407 assuming that a contact point between the axial centerline of the support 407 and the upper surface of the base section 420 is the origin o, assuming that the axial centerline of the support 407 is a z-axis and assuming that a direction separating from the upper surface of the base section 420 is the positive direction of the z-axis. Further, such a movable Cartesian coordinate system x'y'z'o' is provided that an x'-axis coincides with an axial centerline of a shaft of the Cardan joint 415 in contact with the movable plate 414 and moves with the movable plate 414 assuming that a center point of the Cardan joint 415 is the origin o', assuming that the axial centerline of the output shaft 419 is a z'-axis and assuming that a direction separating from the base section 420 is the positive direction of the z'-axis. The motor 403 and the take-up 406 are set on a negative axis of x, the motor 401 and the take-up 404 are set in the fourth quadrant of the fixed Cartesian coordinate system xyzo, and the motor 402 and the take-up 405 are set in the first quadrant of the fixed Cartesian coordinate system xyzo. Universal couplings 416, 417 and 418 are set on points A', B' and C' on a lower surface of the movable plate 414 where phases in a movable plane coordinate system x'o'y' are identical to phases of points A, B and C of wire doorways of the take-ups 404, 405 and 406 in a fixed plane coordinate system xoy respectively. The wire 408 into which the nonlinear spring 411 is incorporated, the wire 409 into which the nonlinear spring 412 is incorporated and the wire 410 into which the nonlinear spring 413 is incorporated are mounted between the take-up 404 and the universal coupling 416, between the take-up 405 and the universal coupling 417 and between the take-up 406 and the universal coupling 418 respectively.

An operation principle is now described.

The movable plate 414 can perform only rotary motion on a y'-axis and the z'-axis since the same is constrained to the Cardan joint 415. A control device for the articulated robot can be constituted by assuming that rotation angles of the movable plate 414 on the y'-axis and the z'-axis are α and β respectively, establishing equations of motion similarly to the embodiment 1 and employing the first control technique or the second control technique. Detailed description thereof is omitted.

When the wire 408 and the wire 409 both retract, the movable plate 414 rotates in the positive direction around the y'-axis. As the point A and the point B approach the y-axis, retracting force lessens although the movable range enlarges. When the wire 410 retracts, on the other hand, the movable plate 414 rotates in the negative direction around the y'-axis. As the point C approaches the y-axis, the retracting force lessens although the movable range enlarges.

When the wire 408 retracts, the movable plate 414 rotates in the positive direction around the x'-axis. As the point A approaches the x-axis, the retracting force lessens although the movable range enlarges. When the wire 409 retracts, on the other hand, the movable plate 414 rotates in the negative direction around the x'-axis. As the point B approaches the x-axis, the retracting force lessens although the movable range enlarges.

As hereinabove described, the robot can be operated by employing only two wires in order to change attitudes of two degrees of freedom, whereby rigidity can also be adjusted when employing three wires.

Figure 6:
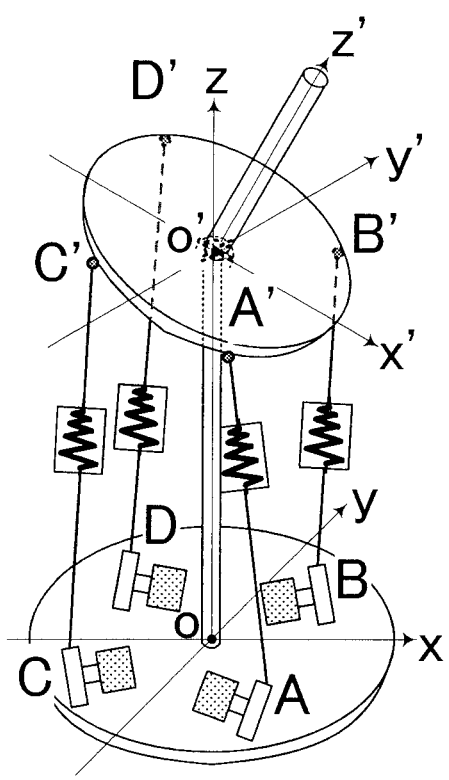
FIG. 6 is a structural diagram of an articulated robot capable of independently controlling rolling, pitching and rigidity of each.

Further, rolling (rotation around an x'-axis) and pitching (rotation around a y'-axis) and rigidity of each can be independently controlled by adding one set of a driving unit constituted of a motor, a take-up, a wire into which a nonlinear spring is incorporated and a universal coupling as in FIG. 6, arranging motors mounted with four take-ups in different quadrants of a fixed plane coordinate system xoy, arranging four universal couplings in different quadrants of a movable plane coordinate system x'o'y' and coupling the motors present in the respective quadrants of the fixed plane coordinate system and the universal couplings present in the same quadrants of the movable plane coordinate system x'o'y' to each other with wires.

Embodiment 3

Figure 5:
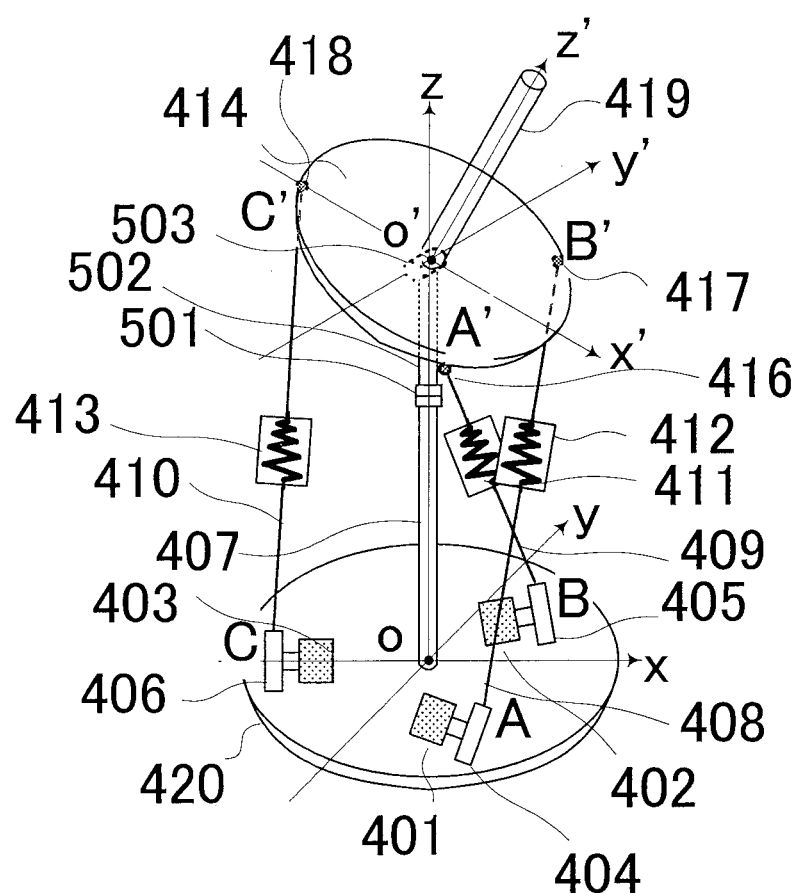
FIG. 5 is a structural diagram of an articulated robot showing a third embodiment.

FIG. 5 is a structural diagram of an articulated robot showing a third embodiment. Referring to the figure, numeral 501 denotes a rotating shaft coupling, numeral 502 denotes a rotating shaft, and numeral 503 denotes a revolving shaft coupling. Elements identical to those in FIG. 4 are denoted by the same reference signs and description thereof is omitted. It is assumed that a rotation centerline of the revolving shaft coupling 503 is a y'-axis, and it is assumed that the intersection between the rotation centerline of the revolving shaft coupling 503 and a centerline of a support 407 is the origin o'. A fixed Cartesian coordinate system xyzo and a movable Cartesian coordinate system x'y'z'o' are so provided that a y-axis is parallel to the y'-axis when an axial centerline of an output shaft 419 coincides with an axial centerline of the rotating shaft 503 and the remaining points are identical to those in the embodiment 2 of FIG. 4. The rotating shaft 502 rotates on a z-axis.

In the articulated robot according to this embodiment shown in FIG. 5, wires are mounted on a portion having the rotating shaft coupling 501, the rotating shaft 502 and the revolving shaft 503 in place of a Cardan joint 415 and between a take-up 404 and a universal coupling 417 and between a take-up 405 and a universal coupling 416 in place of mounting wires between the take-up 404 and the universal coupling 416 and between the take-up 405 and the universal coupling 417 respectively.

An operation principle is now described.

When a wire 408 and a wire 409 both retract, a movable plate 414 rotates in the positive direction around the y'-axis. As a point A and a point B approach the y-axis, retracting force lessens although a movable range enlarges. When a wire 410 retracts, on the other hand, the movable plate 414 rotates in the negative direction around the y'-axis. As a point C approaches the y-axis, the retracting force lessens although the movable range enlarges.

When the wire 408 retracts, the movable plate 414 rotates in the positive direction around the z-axis. As the point A separates from the x-axis, the retracting force lessens although the movable range enlarges. When the wire 409 retracts, on the other hand, the movable plate 414 rotates in the negative direction around the z-axis. As the point B separates from the x-axis, the retracting force lessens although the movable range enlarges.

As hereinabove described, the robot can be operated by employing only two wires in order to change attitudes of two degrees of freedom, whereby rigidity can also be adjusted when employing three wires.

Figure 7:
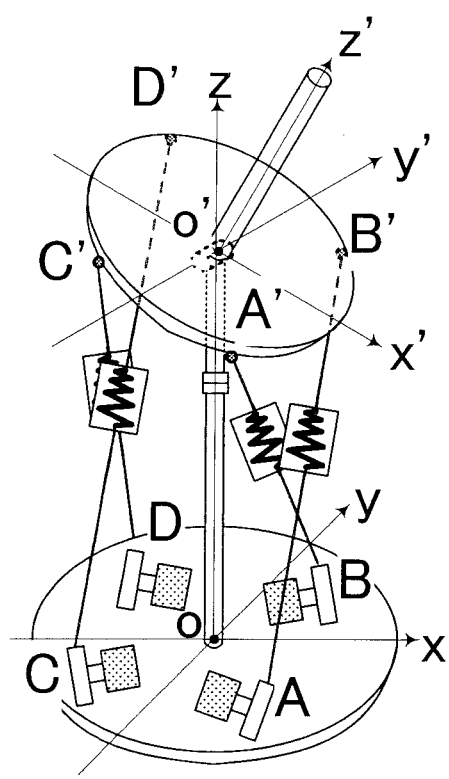
FIG. 7 is a structural diagram of an articulated robot capable of independently controlling yawing, pitching and rigidity of each.

Further, yawing (rotation around a z-axis) and pitching (rotation around a y'-axis) and rigidity of each can be independently controlled by adding one set of a driving unit constituted of a motor, a take-up, a wire into which a nonlinear spring is incorporated and a universal coupling as in FIG. 7, arranging motors mounted with four take-ups in different quadrants of a fixed plane coordinate system xoy, arranging four universal couplings in different quadrants of a movable plane coordinate system x'o'y' and coupling the motors present in the first, fourth, second and third quadrants of the fixed plane coordinate system xoy to the universal couplings present in the fourth, first, third and second quadrants of the movable plane coordinate system x'o'y' respectively with the wires.

Embodiment 4

Figure 8:
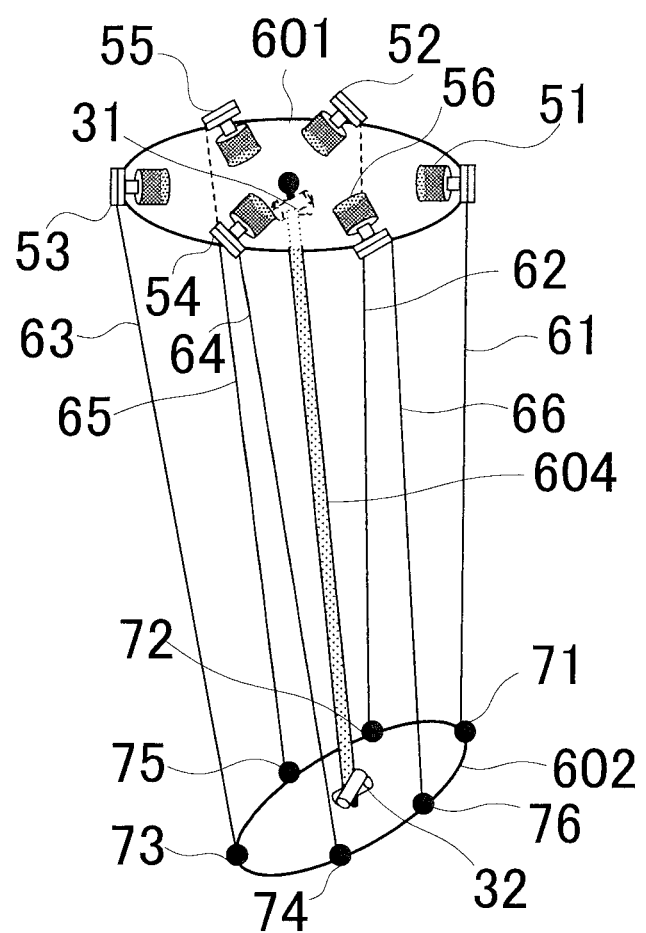
FIG. 8 is a structural diagram of an articulated robot according to a fourth embodiment.

As shown in FIG. 8, an articulated robot 1000 according to this embodiment has a fixed plate 601, two joints (hereinafter all joints are universal couplings in which pairs of rotating shafts are perpendicular to each other), a link 604, six rotary actuators (the rotary actuators include at least rotary motors, gears and pulleys), six biarticular muscles (hereinafter an articular muscle extending over two joints is referred to as a biarticular muscle, and an articular muscle extending over one joint is referred to as a monoarticular muscle) and a movable plate 602.

A first joint 31 is coupled to a central portion of a lower surface of the fixed plate 601, a second joint 32 is coupled to a central portion of an upper surface of the movable plate 602, and the link 604 is coupled between the first joint 31 and the second joint 32. The first joint 31 is so set that a rotating shaft on the fixed plate side is parallel to the plane of the fixed plate 601 and a rotating shaft on the link side is perpendicular to the link 604, while the second joint 32 is so set that a rotating shaft on the movable plate side is parallel to the plane of the movable plate 602 and a rotating shaft on the link side is perpendicular to the link 604. Six rotary actuators 51 to 56 are arranged on the circumference of the fixed plate on six portions at substantially equal intervals, while respective ends of six biarticular muscles 61 to 66 are coupled to the rotary actuators 51 to 56 respectively, and respective remaining ends thereof are coupled to the circumference of the movable plate 602 on six portions corresponding to the six rotary actuators by fixing pins 71 to 76 respectively.

Operation of the articulated robot 1000 according to this embodiment is now described.

The first joint 31 and the second joint 32 are both universal couplings of two degrees of freedom, the rotating shaft on the fixed plate side is parallel to the plane of the fixed plate 601 and the rotating shaft on the link side is perpendicular to the link 602 while the two rotating shafts of the first joint 31 are perpendicular to each other and the rotating shaft on the movable plate side is parallel to the plane of the movable plate 602 and the rotating shaft on the link side is perpendicular to the link 602 while the two rotating shafts of the second joint 32 are perpendicular to each other, whereby the movable plate can be rotationally displaced by four degrees of freedom on the two rotating shafts of the first joint 31 and the two rotating shafts of the second joint 32. On the other hand, arbitrary three of the six biarticular muscles 61 to 66 do not come onto the same plane. Each biarticular muscle is not parallelized to each rotating shaft of each joint unless the movable plate 602 is attitude-displaced with respect to the fixed plate 601 by approximately 90° from a parallel state, and hence force generated by each biarticular muscle independently generates torque with respect to displacement of the movable plate.

It is possible to antagonistically drive the robot to regularly apply constant pretension so that the biarticular muscles do not deviate from grooves of pulleys by employing articular muscles larger in number by two than the number of the degrees of freedom of the robot. Further, rigidity of two degrees of freedom of the robot can also be independently adjusted without exerting influence on position attitude control of the robot by inserting a nonlinear spring element between the rotary motor and the pulley of each rotary actuator. The nonlinear spring denotes a spring whose spring constant is not a constant value but changes due to displacement or tension.

In the articulated robot 1000 according to this embodiment, as hereinabove described, all actuators are arranged on the fixed plate and the movable plate is driven through one link, two joints and several articular muscles, whereby movable portions of the articulated robot become lightweight, and safety heightens. Further, it is also possible to compatibly attain excellent safety and superior control performance by inserting the nonlinear spring elements and adjusting rigidity as necessary.

Embodiment 5

Figure 9:
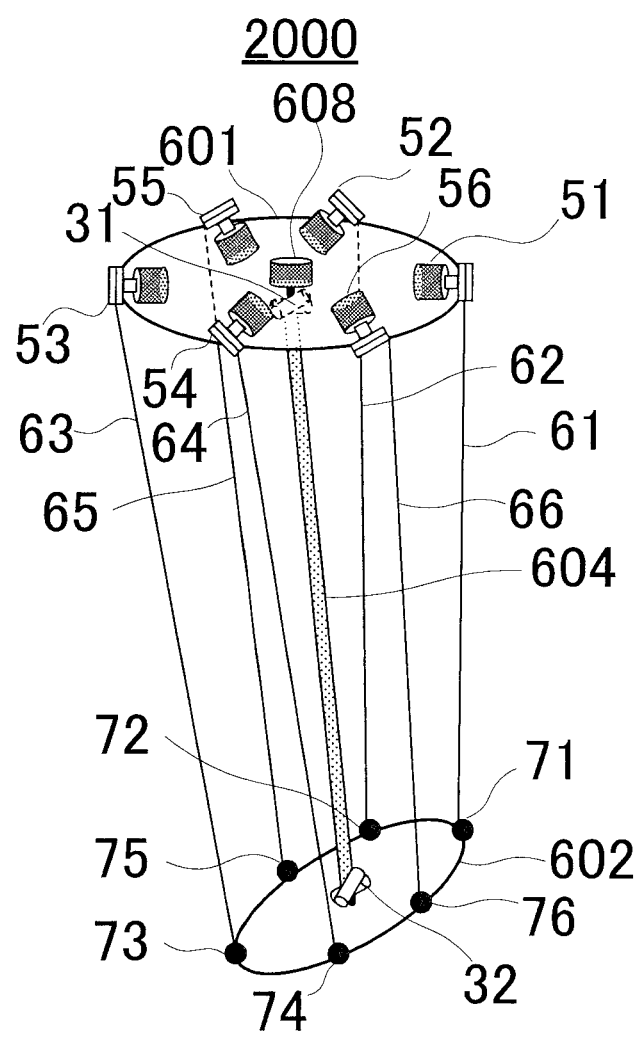
FIG. 9 is a structural diagram of an articulated robot according to a fifth embodiment.

FIG. 9 is a structural diagram of an articulated robot according to a fifth embodiment.

An articulated robot 2000 is different from the articulated robot 1000 according to the fourth embodiment in points that a revolving actuator 608 is added and a first joint 31 is coupled to a needle of the revolving actuator 608 in place of a fixed plate 601, and the remaining structure is similarly constituted.

The revolving actuator 608 is constituted of a revolving motor and a gear, and a revolving shaft is perpendicular to the fixed plate 601. Therefore, a movable plate 602 can be rotated on a vertical shaft by the revolving actuator 608 through the first joint 31, a link 604 and a second joint 32 while being rotation-displaced by four degrees of freedom around on two rotating shafts of the first joint 31 and two rotating shafts of the second joint 32 by six rotary actuators through six biarticular muscles.

Embodiment 6

Figure 10:
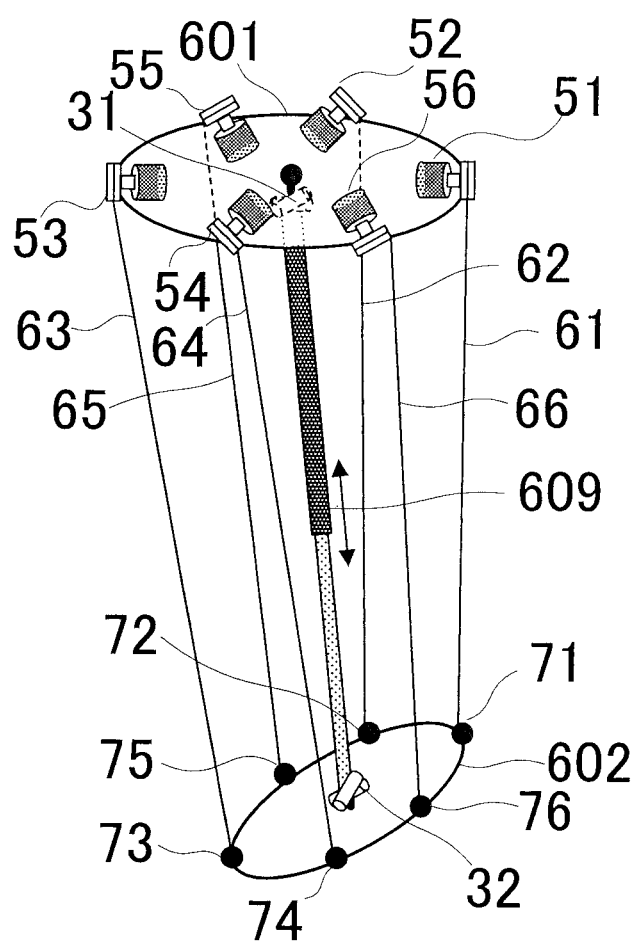
FIG. 10 is a structural diagram of an articulated robot according to a sixth embodiment.

FIG. 10 is a structural diagram of an articulated robot according to a sixth embodiment.

An articulated robot 3000 according to this sixth embodiment is different from the articulated robot 1000 according to the fourth embodiment in a point that the same has a linear actuator 609 in place of the link 604, and the remaining structure is similarly constituted.

In the linear actuator 609, two joints are coupled to both ends, and the direction of expansion and contraction is perpendicular to a rotating shaft of each joint close to the linear actuator. Therefore, a movable plate 602 can be translated in the vertical direction by the linear actuator 609 while being rotation-displaced by four degrees of freedom around two rotating shafts of a first joint 31 and two rotating shafts of a second joint 32 by six rotary actuators through six biarticular muscles.

Embodiment 7

Figure 11:
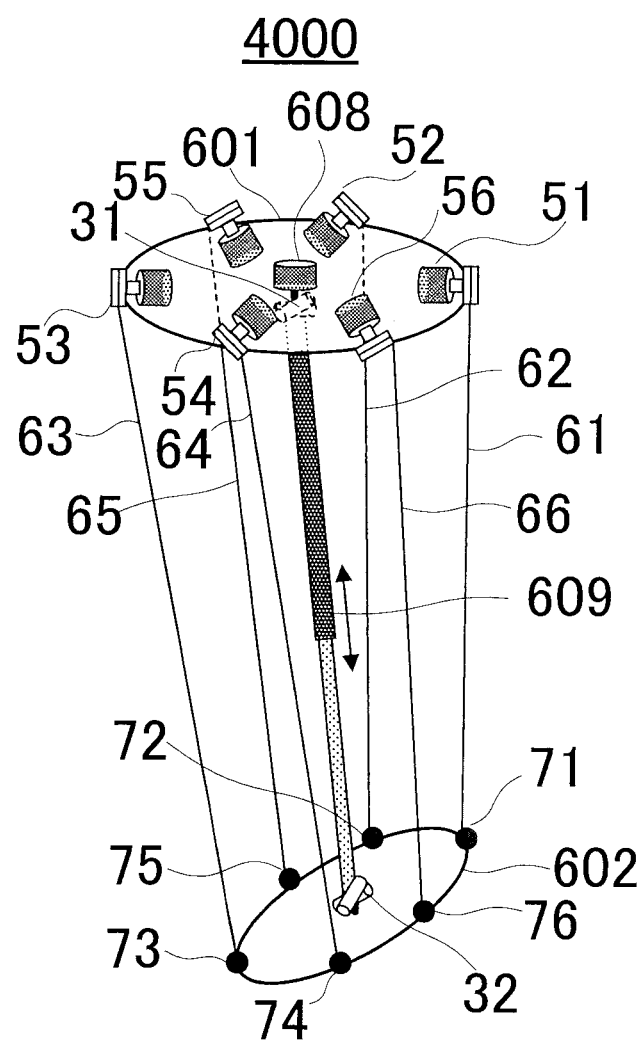
FIG. 11 is a structural diagram of an articulated robot according to a seventh embodiment.

FIG. 11 is a structural diagram of an articulated robot according to a seventh embodiment.

An articulated robot 4000 is different from the articulated robot 3000 according to the sixth embodiment in a point where a revolving actuator 608 is added and a first joint 31 is coupled to a needle of the revolving actuator 608 in place of a fixed plate 601, and the remaining structure is similarly constituted.

A revolving shaft of the revolving actuator 608 is perpendicular to the fixed plate 601. Therefore, a movable plate 602 can be rotated on a vertical shaft by the revolving actuator 608 through the first joint 31, the linear actuator 609 and a second joint 32 while being rotation-displaced by four degrees of freedom on two rotating shafts of the first joint 31 and two rotating shafts of the second joint 32 by six rotary actuators through six biarticular muscles and being translated in the vertical direction by the linear actuator 609.

Embodiment 8

Figure 12:
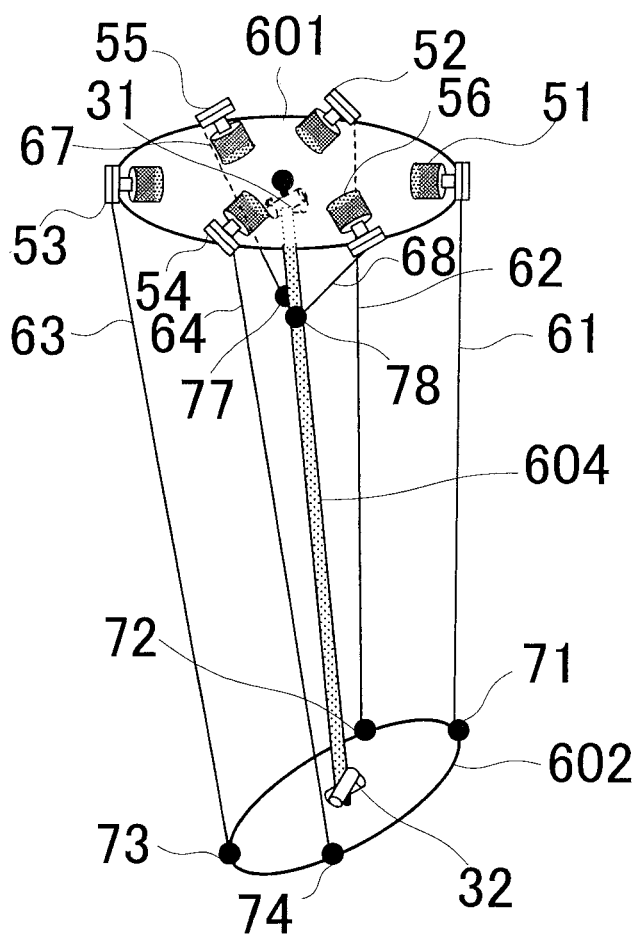
FIG. 12 is a structural diagram of an articulated robot according to an eighth embodiment.

FIG. 12 is a structural diagram of an articulated robot according to an eight embodiment.

An articulated robot 5000 partially replaces biarticular muscles with monoarticular muscles, and couples ends of all monoarticular muscles to a link 604.

In monoarticular muscles 67 and 68 whose ends are coupled to rotary actuators respectively, remaining ends are coupled to the link 604 by fixing pins 77 and 78 respectively. The monoarticular muscles 67 and 68 are arranged on portions close to the base of the articulated robot, whereby the same cause remarkable displacement in a movable plate 602 by small expansion and contraction. On the other hand, biarticular muscles 61 to 64 are directly coupled to the movable plate 602, and hence the same can bear a large load coupled to the movable plate 602. Therefore, the articulated robot 5000 according to this embodiment can perform operation such as high-speed movement or transportation of a heavy load with four degrees of freedom by expanding and contracting the monoarticular muscles, the biarticular muscles, or combinations of the monoarticular muscles and the biarticular muscles as necessary.

Embodiment 9

Figure 13:
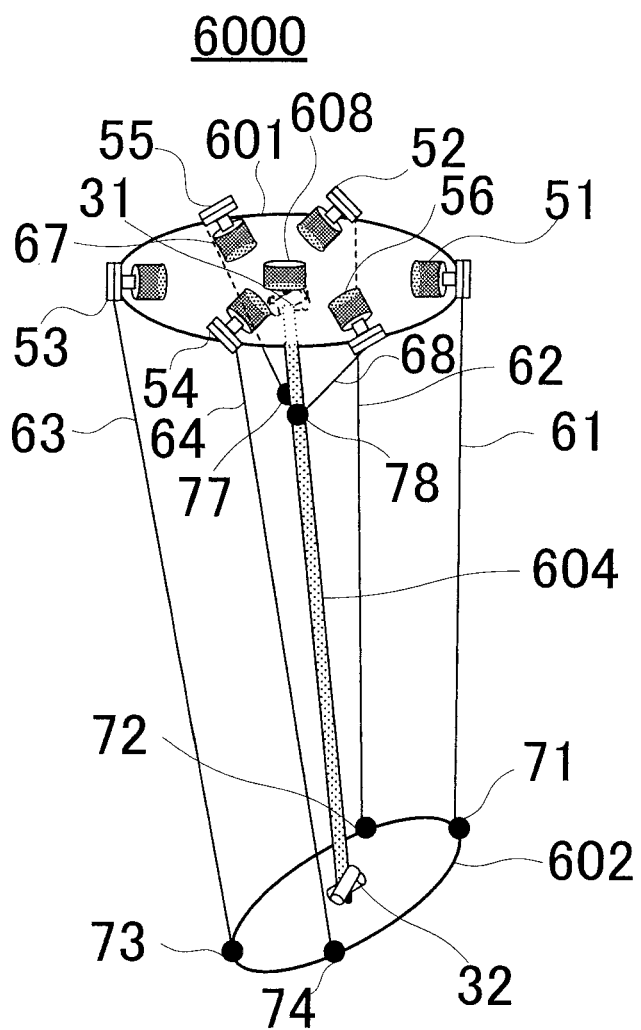
FIG. 13 is a structural diagram of an articulated robot according to a ninth embodiment.

FIG. 13 is a structural diagram of an articulated robot according to a ninth embodiment. An articulated robot 6000 partially replaces biarticular muscles with monoarticular muscles, and couples ends of all monoarticular muscles to a link 604.

In monoarticular muscles 67 and 68 whose ends are coupled to rotary actuators respectively, remaining ends are coupled to the link 604 by fixing pins 77 and 78 respectively. The monoarticular muscles 67 and 68 are arranged on portions close to the base of the articulated robot, whereby the same cause remarkable displacement in a movable plate 602 by small expansion and contraction. On the other hand, biarticular muscles 61 to 64 are directly coupled to the movable plate 602, and hence the same can bear a large load coupled to the movable plate 602. Therefore, the articulated robot 6000 according to this embodiment can perform operation such as high-speed movement or transportation of a heavy load with five degrees of freedom by expanding and contracting the monoarticular muscles, the biarticular muscles, or combinations of the monoarticular muscles and the biarticular muscles as necessary.

Embodiment 10

Figure 14:
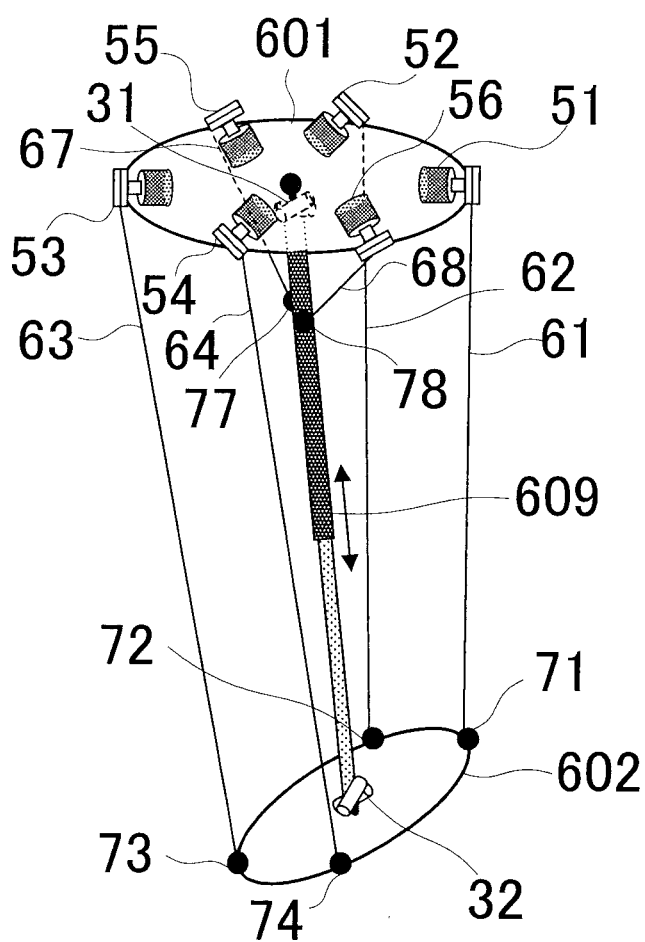
FIG. 14 is a structural diagram of an articulated robot according to a tenth embodiment.

FIG. 14 is a structural diagram of an articulated robot according to a tenth embodiment. An articulated robot 7000 partially replaces biarticular muscles with monoarticular muscles, and couples ends of all monoarticular muscles to a linear actuator 609.

In monoarticular muscles 67 and 68 whose ends are coupled to rotary actuators respectively, remaining ends are coupled to the linear actuator 609 by fixing pins 77 and 78 respectively. The monoarticular muscles 67 and 68 are arranged on portions close to the base of the articulated robot, whereby the same cause remarkable displacement in a movable plate 602 by small expansion and contraction. On the other hand, biarticular muscles 61 to 64 are directly coupled to the movable plate 602, and hence the same can bear a large load coupled to the movable plate 602. Therefore, the articulated robot 7000 according to this embodiment can perform operation such as high-speed movement or transportation of a heavy load with five degrees of freedom by expanding and contracting the monoarticular muscles, the biarticular muscles, or combinations of the monoarticular muscles and the biarticular muscles as necessary.

Embodiment 11

Figure 15:
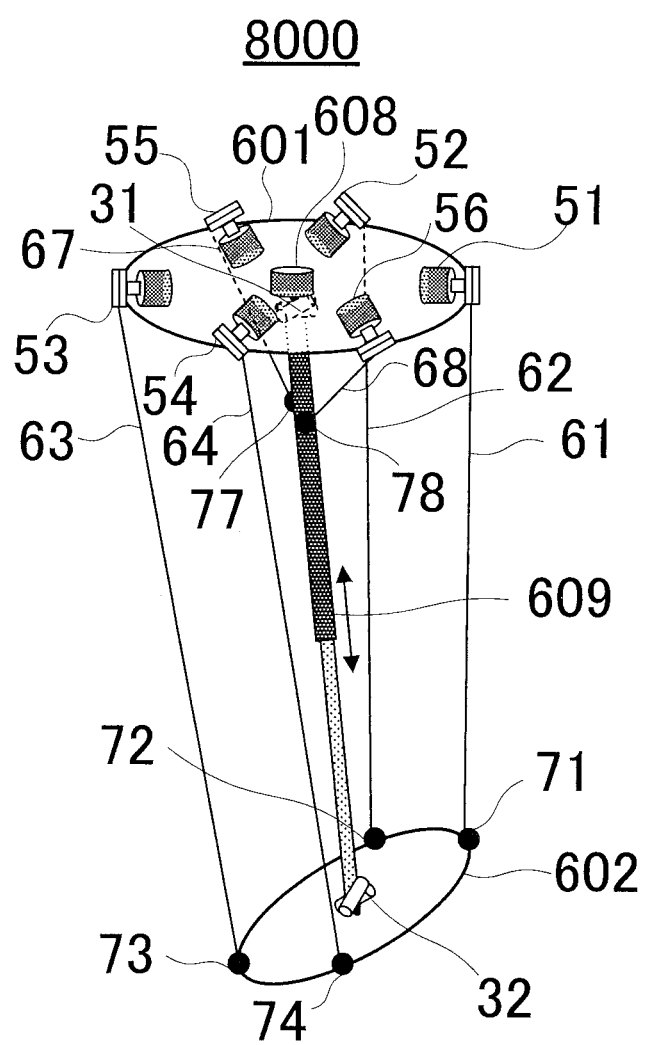
FIG. 15 is a structural diagram of an articulated robot according to an eleventh embodiment.

FIG. 15 is a structural diagram of an articulated robot according to an eleventh embodiment. An articulated robot 8000 partially replaces biarticular muscles with monoarticular muscles, and couples ends of all monoarticular muscles to a linear actuator 609.

In monoarticular muscles 67 and 68 whose ends are coupled to rotary actuators respectively, remaining ends are coupled to the linear actuator 609 by fixing pins 77 and 78 respectively. The monoarticular muscles 67 and 68 are arranged on portions close to the base of the articulated robot, whereby the same cause remarkable displacement in a movable plate 602 by small expansion and contraction. On the other hand, biarticular muscles 61 to 64 are directly coupled to the movable plate 602, and hence the same can bear a large load coupled to the movable plate 602. Therefore, the articulated robot 8000 according to this embodiment can perform operation such as high-speed movement or transportation of a heavy load with six degrees of freedom by expanding and contracting the monoarticular muscles, the biarticular muscles, or combinations of the monoarticular muscles and the biarticular muscles as necessary.

The embodiments have been described. For the so-called those skilled in the art, however, it is possible to properly perform modifications from the aforementioned embodiments in the range not deviating from the subject matter of the invention, and it is also possible to properly combine and utilize the aforementioned embodiments and techniques according to modifications. In other words, it goes without saying that techniques to which such modifications etc. are applied are also included in the technical range of the invention.

For example, while the number of the rotary actuators and the number of the biarticular muscles have been both set to six, both may simply be set to at least five. While the number of the rotary actuators has been set to six, for example, and the numbers of the biarticular muscles and the monoarticular muscles have been set to four and two respectively, for example, in the embodiments 5 to 8, the number of the rotary actuators may simply be at least five, the number of the biarticular muscles may simply be at least three, and the sum of the number of the biarticular muscles and the number of the monoarticular muscles may simply be equal to the number of the rotary actuators.

What is claimed is:

1. A robot comprising:
a base section;
at least three motors set on the base section;
at least three take-ups mounted on the motors respectively;
a support set on a surface of the base section and having an axial centerline perpendicular to the surface of the base section;
a Cardan joint mounted on an upper end of the support and including a first shaft and a second shaft, the first shaft being in contact with the support;
a movable plate mounted on the Cardan joint, the second shaft of the Cardan joint being in contact with the movable plate;
at least three universal couplings set on a bottom portion of the movable plate;
wires into which nonlinear springs coupling the take-ups and the universal couplings in one-to-one correspondence to each other are incorporated;
an output shaft fixed to an upper surface of the movable plate and having an axial centerline perpendicular to the upper surface of the movable plate;
a control device configured to control tension on the basis of a tension command for each of the wires and a tension signal for each of the wires, configured to generate the tension command for each of the wires on the basis of a target command for an attitude angle, a target command for rigidity, and a rotation angle signal for each of the motors, and configured to control an attitude angle and rigidity of the robot, the control device comprising:
an attitude angle estimator configured to calculate an estimated value of the attitude angle on the basis of the rotation angle signal for each of the motors and the tension signal for each of the wires;
an attitude angle controller configured to receive a deviation between the target command for the attitude angle and the estimated value of the attitude angle and configured to output an attitude toque command; and
a tension command calculator configured to calculate the tension command on the basis of the attitude torque command, the target command for rigidity, and the estimated value of the attitude angle;
a fixed Cartesian coordinate system defined on the base section and comprising:
an x-axis;
a y-axis parallel to an axial centerline of the first shaft of the Cardan joint, an intersection between the axial centerline of the support and the surface of the base section being defined as an origin of the fixed Cartesian coordinate system; and
a z-axis defined to coincide with the axial centerline of the support and having a positive direction separating from the surface of the base section; and
a movable Cartesian coordinate system defined on the movable plate to be movable with the movable plate and comprising:
an x'-axis parallel to an axial centerline of the second shaft of the Cardan joint, an intersection between the axial centerline of the output shaft and a lower surface of the movable plate being defined as an origin of the movable Cartesian coordinate system;
a y'-axis; and
a z'-axis defined to coincide with the axial centerline of the output shaft and having a positive direction separating from the upper surface of the movable plate,
wherein the motors are arranged so that one of the take-ups is present on a negative side of the x-axis and at least two of the take-ups are respectively present in a first quadrant and a fourth quadrant of an xoy coordinate system defined by the x-axis and the y-axis, the universal couplings being arranged so that phases in an x'o'y' coordinate system defined by the x'-axis and the y'-axis reach the same values as respective phases of the take-ups in the xoy coordinate system, the take-ups and the universal couplings being coupled in the same phases of the fixed and movable Cartesian coordinate systems respectively in one-to-one correspondence to each other with the wires.

2. A robot comprising;
a base section;
at least three motors set on the base section;
at least three take-ups mounted on the motors respectively;
a support set on a surface of the base section and having an axial centerline perpendicular to the surface of the base section;
a rotating shaft coupling mounted on an upper end of the support;
a rotating shaft mounted on the rotating shaft coupling;
a revolving shaft coupling mounted on an upper end of the rotating shaft;
a movable plate mounted on the revolving shaft coupling;
at least three universal couplings set on a bottom portion of the movable plate;
wires into which nonlinear springs coupling the take-ups and the universal couplings in one-to-one correspondence to each other are incorporated;
an output shaft fixed to an upper surface of the movable plate and having an axial centerline perpendicular to the upper surface of the movable plate;
a control device configured to control tension on the basis of a tension command for each of the wires and a tension signal for each of the wires, configured to generate the tension command for each of the wires on the basis of a target command for an attitude angle, a target command for rigidity, and a rotation angle signal for each of the motors, and configured to control an attitude angle and rigidity of the robot, the control device comprising:
an attitude angle estimator configured to calculate an estimated value of the attitude angle on the basis of the rotation angle signal for each of the motors and the tension signal for each of the wires;
an attitude angle controller configured to receive a deviation between the target command for the attitude angle and the estimated value of the attitude angle and configured to output an attitude toque command; and
a tension command calculator configured to calculate the tension command on the basis of the attitude torque command, the target command for rigidity, and the estimated value of the attitude angle;
a movable Cartesian coordinate system defined on the movable late to be movable with the movable plate and comprising
an x'-axis;
a y'-axis parallel to an axial centerline of the revolving shaft, an intersection between the axial centerline of the output shaft and a lower surface of the movable plate being defined as an origin; and
a z'-axis having a positive direction separating from the upper surface of the movable plate; and
a fixed Cartesian coordinate system defined on the base section and comprising:
an x-axis;
a y-axis parallel to a y"-axis when the axial centerline of the output shaft coincides with an axial centerline of the rotating shaft, an intersection between the axial centerline of the support and the surface of the base section being defined as an origin of the fixed Cartesian coordinate system; and a z-axis defined by the axial centerline of the support and having a positive direction separating from the surface of the base section, wherein three of the motors are arranged so that one of the take-ups is present on a negative side of the x-axis and remaining two of the take-ups are respectively present in a first quadrant and a fourth quadrant of an xoy coordinate system defined by the x-axis and the y-axis, three of the universal couplings being arranged so that phases in an x'o'y' coordinate system defined by the x'-axis and the y'-axis reach the same values as phases of three of the take-ups in the xoy coordinate system respectively, the wires including a first wire, a second wire, and a third wire, the take-up present on a negative side of the x-axis being coupled to the universal coupling present on a negative side of the x'-axis with the first wire, the take-up present in the first quadrant of the xoy coordinate system being coupled to the universal coupling present in a fourth quadrant of the x'o'y' coordinate system with the second wire, the take-up present in the fourth quadrant of the xoy coordinate system being coupling to the universal coupling present in a first quadrant of the x'o'y' coordinate system with the third wire.

3. A control device for a robot performing control of tension on the basis of a tension command for a wire and a tension signal for the wire, generating the tension command for the wire on the basis of a target command for an attitude angle, a target command for rigidity and a rotation angle signal for a motor and controlling an attitude angle and rigidity of the articulated robot, comprising:

an attitude angle estimator configured to calculate an estimated value of the attitude angle on the basis of the rotation angle signal for the motor and the tension signal for the wire;

an attitude angle controller configured to receive the deviation between the target command for the attitude angle and the estimated value of the attitude angle and configured to output an attitude torque command; and a tension command calculator configured to calculate the tension command on the basis of the attitude torque command, the target command for rigidity, and the estimated value of the attitude angle.

* * * * *